(12) United States Patent
Daemen et al.

(10) Patent No.: US 7,361,411 B2
(45) Date of Patent: Apr. 22, 2008

(54) HARDFACING ALLOY, METHODS, AND PRODUCTS

(75) Inventors: Roger Auguste Daemen, Grignan (FR); Keith E. Moline, Houston, TX (US)

(73) Assignee: ATT Technology, Ltd., Houston, TX (US)

(*) Notice: Subject to any disclaimer, the term of this patent is extended or adjusted under 35 U.S.C. 154(b) by 456 days.

(21) Appl. No.: 10/419,713

(22) Filed: Apr. 21, 2003

(65) Prior Publication Data

US 2004/0206726 A1 Oct. 21, 2004

(51) Int. Cl.
| B32B 15/01 | (2006.01) |
| B32B 15/18 | (2006.01) |
| B23K 35/22 | (2006.01) |
| B23K 101/20 | (2006.01) |
| C22C 38/02 | (2006.01) |
| C22C 38/04 | (2006.01) |
| C22C 38/08 | (2006.01) |
| C22C 38/12 | (2006.01) |

(52) U.S. Cl. ............ 428/684; 428/601; 428/627; 420/119; 420/121; 420/127; 148/330; 148/336; 219/76.1

(58) Field of Classification Search .......... 428/601, 428/627, 684; 420/119, 121, 127; 148/330, 148/336; 219/76.1
See application file for complete search history.

(56) References Cited

U.S. PATENT DOCUMENTS

| 1,494,693 A | 5/1924 | Loi |
| 1,810,948 A | 6/1931 | Dorn |
| 1,889,866 A | 12/1932 | Montgomery |

(Continued)

FOREIGN PATENT DOCUMENTS

| AU | B-65917/94 | 1/1995 |
| BE | 903365 | 2/1986 |
| CA | 1245621 | 11/1988 |
| CA | 2328190 | 6/2001 |
| CN | 1285739 C | 11/2006 |

(Continued)

OTHER PUBLICATIONS

Mobley, John G., "The Facts and Myths of Hardbanding," presented in Oct. 2000, (3 pages).
Haberer, Joe, "Viable drill pipe hardbanding strategies are outlined," published in Drilling Contractor periodical in Nov. / Dec. 2000 issue, pp. 48–49 (2 pages).
Dudman, Roy L. et al., "Drill string design, drilling techniques impact wear," published in Drilling Contractor periodical in Mar. / Apr. 2001 issue, pp. 25, 27, and 28 (3 pages).

(Continued)

*Primary Examiner*—Jennifer C. McNeil
*Assistant Examiner*—Jason L Savage
(74) *Attorney, Agent, or Firm*—Strasburger & Price, LLP (57) ABSTRACT

Disclosed is a hardfacing alloy capable of withstanding service abrasion of the order of silicious earth particles and weldable on industrial products, such as tool joints and stabilizers used in oil and gas well drilling, and other industrial products. The hardfacing alloy has a low coefficient of friction resulting from excellent metal to metal resistance and significant reduction in industrial wear on industrial products, such as casing wear. Other embodiments of the invention include tool joints having the hardbanding alloy welded to the outer cylindrical surface to its box and pin members and to stabilizer ribs on the stabilizer used in earth boring, such as boring for oil and gas, other industrial products, and methods of applying the hardfacing alloy to their surfaces. The hardfacing alloy does not require any post weld treatment, has primary borides in its microstructure, the carbons in the alloy are tied up in the formation of secondary carbides which add to the abrasion resistance, and have a quadratic crystallographic structure and a hardness of about 1725 Hv comparable to the prior art hardness of the chromium carbide primary carbide alloys of the prior art but is substantially less brittle than C—Cr—Fe hardfacing alloys.

7 Claims, 5 Drawing Sheets

U.S. PATENT DOCUMENTS

| | | | |
|---|---|---|---|
| 1,889,867 A | | 12/1932 | Montgomery |
| 2,259,232 A | * | 10/1941 | Stone .................. 175/325.5 |
| 2,262,211 A | * | 11/1941 | Stone .................. 175/325.5 |
| 2,320,107 A | | 5/1943 | Speckert |
| 2,440,441 A | | 4/1948 | Hanes |
| 2,513,621 A | | 7/1950 | Boice |
| 2,546,295 A | | 3/1951 | Boice |
| 2,592,854 A | | 4/1952 | Boice |
| 2,626,190 A | | 1/1953 | Boice |
| 2,653,061 A | | 9/1953 | Lewis |
| 2,992,019 A | | 7/1961 | MacArthur |
| 3,067,593 A | * | 12/1962 | Marcus .................. 464/183 |
| 3,343,890 A | | 9/1967 | Homer |
| 3,402,459 A | | 9/1968 | Arnoldy |
| 3,407,478 A | | 10/1968 | Arnoldy |
| 3,494,749 A | | 2/1970 | Arnoldy |
| 3,936,655 A | | 2/1976 | Arnoldy |
| 3,953,034 A | * | 4/1976 | Nelson .................. 473/220 |
| 3,989,554 A | * | 11/1976 | Wisler .................. 285/333 |
| 3,993,368 A | | 11/1976 | Jurgens et al. |
| 4,000,549 A | | 1/1977 | Brumley et al. |
| 4,043,611 A | | 8/1977 | Wallace |
| 4,143,258 A | * | 3/1979 | McCann et al. .................. 219/73 |
| 4,172,162 A | * | 10/1979 | Danzey, Jr. .................. 427/225 |
| 4,237,362 A | | 12/1980 | Arnoldy |
| 4,245,709 A | | 1/1981 | Manuel |
| 4,256,518 A | * | 3/1981 | Bolton et al. .................. 148/521 |
| 4,277,108 A | | 7/1981 | Wallace |
| 4,431,902 A | * | 2/1984 | Wallen .................. 219/125.12 |
| 4,444,147 A | | 4/1984 | Dahlgren et al. |
| 4,493,963 A | | 1/1985 | Arnoldy |
| 4,533,563 A | | 8/1985 | Dahlgren et al. |
| 4,586,957 A | * | 5/1986 | Masumoto et al. .................. 420/42 |
| 4,613,741 A | | 9/1986 | Arnoldy |
| 4,665,996 A | | 5/1987 | Foroulis et al. |
| 4,844,179 A | | 6/1987 | Forrest et al. |
| 4,708,203 A | | 11/1987 | Walker |
| 4,723,060 A | | 2/1988 | Arnoldy |
| 4,753,300 A | | 6/1988 | Shaw et al. |
| 4,799,544 A | | 1/1989 | Curlett |
| 4,813,493 A | | 3/1989 | Shaw et al. |
| 4,915,426 A | | 4/1990 | Skipper |
| 4,942,059 A | * | 7/1990 | Wilson .................. 427/596 |
| 5,040,622 A | | 8/1991 | Winship et al. |
| 5,066,546 A | * | 11/1991 | Materkowski .................. 428/627 |
| 5,224,559 A | | 7/1993 | Arnoldy |
| 5,244,559 A | * | 9/1993 | Latz .................. 204/298.09 |
| 5,569,395 A | | 9/1993 | Arnoldy |
| 5,343,967 A | | 9/1994 | Kruger et al. |
| 5,350,560 A | | 9/1994 | Kasiske |
| 5,377,410 A | | 1/1995 | Welch |
| 5,403,410 A | * | 4/1995 | Shikanai et al. .................. 148/328 |
| 5,458,097 A | * | 10/1995 | Devine et al. .................. 123/90.48 |
| 6,062,326 A | | 9/1996 | Strong et al. |
| 5,740,872 A | * | 4/1998 | Smith .................. 175/374 |
| 5,749,605 A | | 5/1998 | Hampton, III et al. |
| 5,824,922 A | * | 10/1998 | Aonuma et al. .................. 75/236 |
| 5,824,992 A | | 10/1998 | Nagarajan et al. |
| 5,826,651 A | | 10/1998 | Lee et al. |
| 5,826,921 A | | 10/1998 | Woolley |
| 5,857,141 A | | 1/1999 | Keegan et al. |
| 5,857,531 A | | 1/1999 | Estep et al. |
| 5,887,655 A | | 3/1999 | Haugen et al. |
| 6,557,654 B1 | | 7/1999 | Murray |
| 6,117,493 A | | 9/2000 | North |
| 6,158,531 A | | 12/2000 | Vail, III |
| 6,326,582 B1 | | 12/2001 | North |
| 6,582,126 B2 | | 2/2002 | North |
| 6,375,895 B1 | * | 4/2002 | Daemen .................. 420/105 |
| 7,028,788 B2 | | 12/2002 | Strand et al. |
| 7,082,997 B2 | | 12/2002 | Slack |
| 7,124,825 B2 | | 12/2002 | Slack |
| 6,679,335 B2 | | 1/2003 | Slack et al. |
| 7,219,727 B2 | | 1/2003 | Slack et al. |
| 6,516,880 B1 | | 2/2003 | Otten et al. |
| 6,680,129 B2 | * | 1/2004 | Wang et al. .................. 420/105 |
| 7,013,992 B2 | | 3/2004 | Tessari et al. |
| 6,888,088 B2 | | 5/2004 | Bolton et al. |
| 6,761,777 B1 | * | 7/2004 | Radon .................. 148/325 |
| 2002/0054972 A1 | | 5/2002 | Charpentier et al. |
| 2004/0206726 A1 | | 10/2004 | Daemen et al. |
| 2006/0102354 A1 | | 5/2006 | Gammage et al. |
| 2006/0207801 A1 | | 9/2006 | Clayton |

FOREIGN PATENT DOCUMENTS

| | | |
|---|---|---|
| DE | 10196345 T1 | 7/2003 |
| EP | 0634245 B1 | 1/1995 |
| EP | 0634245 A1 | 1/1995 |
| EP | 0783074 A2 | 7/1997 |
| EP | 0816628 A1 | 1/1998 |
| FR | 2586748 A1 | 3/1987 |
| GB | 115279 | 5/1918 |
| GB | 115311 | 5/1918 |
| GB | 1021297 | 3/1966 |
| GB | 2381536 A | 12/2001 |
| GB | 2376730 A | 12/2002 |
| GB | 2376731 A | 12/2002 |
| JP | 03-140450 A | 6/1991 |
| JP | 03-140450 * | 6/1991 |
| NO | 169610 B | 7/1992 |
| WO | WO-8808069 | 10/1988 |
| WO | WO-99/25949 | 5/1999 |
| WO | WO-02/10630 A1 | 2/2002 |
| WO | WO-02/103154 A1 | 12/2002 |
| WO | WO-02/103156 A1 | 12/2002 |
| WO | WO-2004/027207 | 4/2004 |

OTHER PUBLICATIONS

Smith Services website, "Machine Shop Services–Hardbanding" (1 page) (no date).

Arnco website, "Raised Hardbanding Statistics," © Arnco Technology Trust, Ltd. (1 page).

U.S. Provisional Application No. 60/780,118 filed Mar. 8, 2006.

U.S. Appl. No. 08/905149 titled "Hardfaced Water Walls" filed Aug. 1, 1997 (25 pages).

Search and Examination Report by the British Patent Office for Application No. GB0228984.1, which became Patent No. GB–2381536 A, Jul. 20, 2004 (1 page).

International Search Report for International Application No. PCT/US04/13715, which corresponds with Pub. No. US 2004/0206726 A1.

Notice of Allowability mailed Mar. 22, 2005 with Reason for Allowance along with Notices of References Cited by Examiner in U.S. Appl. No. 10/419,713 (6 pages).

Jun. 13, 2007 Micropatent Family Lookup corresponding to US–4,753,300 (2 pages).

Jun. 13, 2007 Micropatent Family Lookup corresponding to US–4,813,493 (2 pages).

Brantly, J. E., "History of Oil Well Drilling," © 1971, published by Gulf Publishing Company, pp. 1028–1029 (cited in Pub. No. US 2004/0206726 A1) (6 pages).

Composite Catalog of Oil Field Equipment & Services, $32^{nd}$ Revision, 1976–77, vol. 2 pages 3216–3219 (cited in Pub. No. US 2004/0206726 A1) (5 pages).

* cited by examiner

HARDFACING ALLOY, METHODS, AND PRODUCTS

FIELD OF THE INVENTION

The present invention is in the field of hardfacing alloys having high abrasion resistance for improving the service life of surfaces of industrial products subject to wear such as tool joints, drill collars, and stabilizers used in drilling strings for earth boring for oil and gas as well as other industrial products subjected to high abrasion.

BACKGROUND OF THE INVENTION

There has been a severe problem with the service life of tool joints and stabilizers used in earth boring such as drilling a bore hole in the earth to a formation or formations from which oil or gas are to be produced since approximately 95 percent of the surface of the earth is composed of silicious materials which are very abrasive and which cause considerable wear on the surfaces of tool joints and stabilizers, as well as on wear prone surfaces of other industrial products.

There have been numerous attempts to provide hardfacing alloys suitable for welding protective hardfacing (referred to as "hardbanding") on tool joints. For a description of prior art hardbanding for tool joints, reference is made to U.S. Pat. No. 4,256,518, the composite catalog of oil field equipment and services, 1976/77 edition, at pages 3216-19 and pages 4994-5; U.S. Pat. No. 3,067,593. Also, for the use of hardbanding materials, such as tungsten carbide particles to form a hardened surface at a tool joint to increase wear resistance, reference is made to U.S. Pat. No. 3,989,554 issued Nov. 2, 1976 and the history of oil well drilling by J. E. Brantly published in 1971 by the book division of Gulf Publishing Company, Houston, Tex. Also, reference is made to U.S. Pat. Nos. 2,259,232; 2,262,211; 4,431,902; and 4,942,059 which illustrate various prior art ways to hardband tool joints.

Historically, and in practice, tool joints on drilling strings (pipe) such as used in drilling oil and gas wells have been faced at the bottom of the box end with tungsten carbide to resist the abrasion of the rock earth in the drill hole on the tool joint. This has three disadvantages. Tungsten carbide is expensive, it acts as a cutting tool to cut the well casing in which it runs, and the matrix is a soft steel which erodes away easily to allow the carbide particles to fall away.

Most prior art hardfacing materials harder than silicious earth materials are brittle and crack in a brittle manner after solidification and upon cooling due to the brittle nature of its structure and the inability of the structure to withstand solidification shrinkage stresses and typically emit sound energy upon cracking as well as causing considerable casing wear as previously stated. These hardfacing materials are alloys which belong to a well-known group of "high Cr-irons" and their high abrasive resistance is derived from the presence in the microstructure of the Cr-carbides of the eutectic and/or hypereutectic type. In the as-welded condition, whatever the precautions taken, these hardfacing overlays always show a more or less dense network of cracks. Preheat of the base material being hardfaced is not a prerequisite. On the contrary, the lower the preheat and interpass temperatures, the denser the network of cracks which has been considered as a favorable factor from the point of view of the risk of crack propagation into the base material under service conditions.

In the 50 year history of hardbanding tool joints or stabilizers of drilling pipe, no facing which cracked during application to the drilling pipe has been used in practice prior to the development of the invention in U.S. Pat. No. 6,375,895 which includes preheat and post-welding conditions for the hardfacing to withstand abrasive use.

In most industries, however, the metal components which make up the structure and equipment of a given plant must have integrity, which means being free of any kind of cracks since these might be expected to progress through the piece and destroy the part.

When the loss of human life may be involved or when great property damage may result, the requirements for integrity are particularly strict. Examples of such industrial products are pressure vessels in the process industries, structural members in buildings and bridges, and down hole drilling equipment in the oil and gas industry.

Silicious earth particles have a hardness of about 800 Brinell hardness number (BHN). In U.S. Pat. No. 5,244,559 the hardfacing material used is of the group of high Cr-irons that contains primary carbides which have a hardness of about 1700 Hv in a matrix of a hardness of at least 300 BHN to 600 Hv. These primary carbides at this high hardness are brittle, have little tensile strength and hence pull apart on cooling from molten state at a frequency that depends on the relative quantity of the primary carbides in the mix of metal and carbide. Thus, this type of hardfacing material, which is harder than silicious earth materials, when applied by welding or with bulk welding form shrinkage cracks across the weld bead. This material has been applied extensively and successfully during many years for the hardbanding of tool joints and hardfacing of other industrial products. Although the material has become and still is widely accepted by the trade, some users have expressed a desire for a hardbanding tool joint alloy combining the property of minimum possible amount of wear in drill casing with the capability of being welded free of brittle cracks in order to minimize any concerns of mechanical failure risks.

U.S. Pat. No. 6,375,865 describes an alloy having a martensitic-austenitic microstructure from which primary as well as secondary carbides are absent. It is preheated before welding to the industrial product and cooled down after welding.

Wear by abrasion mechanisms always has been, and still remains a main concern in many segments of industry: drilling, mining, quarrying, processing and handling of minerals in general and of highly silicious minerals in particular.

Many base materials and hardfacing alloys have been developed in the past with the aim of achieving the highest possible abrasion resistance compatible with factors such as their decay by mechanical incidences: ruptures and/or spalling.

Typical examples of very highly abrasion resistant hardfacing alloys can be found in the well known family of the high Cr-Irons (high chromium irons), and in particular by a high Cr-Iron such as described in U.S. Pat. No. 5,244,559.

These alloys derive their abrasion resistance properties essentially from their metallographical structure, based on the precipitation of Primary Cr-Carbides. Structures of this type are however affected by a high degree of brittleness and a high sensitivity to cracking when deposited by welding. Hence they exhibit quite a high risk of spalling under actual service conditions. In addition they are not characterized by particularly attractive or low friction coefficients.

Considering the drilling for oil and gas application, in order to reduce the wear induced in the casings by the tool joints, attempts have been made to improve on friction coefficients while maintaining a reasonable and acceptable level of abrasive wear resistance. These efforts have resulted in the development of a Martensitic-Austenitic alloy as described in U.S. Pat. No. 6,375,895 Bi. Alloys of this structural type can be deposited crack-free and are characterized by excellent metal to metal wear properties and low brittleness Hence their susceptibility to spalling is much reduced, however at the expense of a lower resistance against wear by pure abrasion.

The development of the present invention of a new Fe-boron based hardfacing alloy achieves an improved and better optimized balance between abrasive wear resistance and metal to metal wear resistance being particularly advantageous for tool-joint and stabilizer applications.

In order to achieve this goal, an entirely novel approach was needed. As will be described further in more detail, it has consisted in the adoption of Boron instead of Chromium as the element of choice to ensure both the most appropriate microstructures and the required degrees of hardenability.

Years of field experience, gained with the Cr-carbide and with the Martensitic-Austenitic alloys in the field of oil and gas drilling, have demonstrated both its advantages and shortcomings.

Field testing, conducted on tool-joints of the Fe-boron alloy of the present invention, under conditions of drilling through various geological mineral formations from extremely abrasive to lesser abrasive ones has demonstrated beyond any doubt that the new approach which was adopted for the hardfacing alloys of the present invention has enabled the full accomplishment of the above outlined goal consisting in the production of a hardfacing alloy capable of achieving an exceptional combination of both high metal to metal wear resistance and extreme resistance to abrasion. In this perspective, the field test results fully confirm the results of extensive preliminary laboratory testing of the Fe-boron hardfacing alloy of the present invention.

The properties of Boron as an alloying element have been exploited in a number of cases for achieving different objectives. These cases are however limited to low-alloyed carbon-steel weld metals in which boron is used often in conjunction with Titanium to promote the formation of a particular type of phase known as acicular ferrite. The aim there was to achieve improved impact properties. The Boron additions were limited to a few parts per million (ppm).

Also, in high Carbon high alloyed Fe-based hardfacing weld metals, Boron has been used at levels of about up to 1 percent with the objective of strengthening the matrices by induction of martensitic types of transformation, but in all cases at the expense of a significant increase of the brittleness of the alloys especially when boron additions are combined with high carbon contents.

A significant difference, which has important practical implications, is that the hardfacing alloy of the present invention contains primary borides and a low carbon content characterized by a quadratic crystallographic structure which while having cracks functions essentially as crack-free hardfacing in use; whereas, the primary Cr-carbides solidify with a form of a hexagonal structure and a higher Carbon content and which when welded in place have brittle cracks.

It would be highly desirable and advantageous to provide a hardfacing alloy composition and industrial products hard surfaced with it capable of having the exceptional combination of both high metal to metal wear resistance and extreme resistance to abrasion such as by hardbanded on tool joints and stabilizers as well as other industrial products.

SUMMARY OF THE INVENTION

The hardfacing alloy of the present invention is particularly suited for welding on wear prone surfaces of tool joints and stabilizers (hardbanding) where it provides great protection from abrasion and has an optimum balance between the minimizing of induced casing wear and the maximizing of tool joint resistance in the casing, for example, about 40 percent less casing wear than the hardfacing alloy of U.S. Pat. No. 5,244,559.

The hardfacing alloy of the present invention is welded to a surface using a metal, such as iron, cored tubular wire containing the alloy in powdered form.

The hardfacing alloy of the present invention has an all weld metal composition undiluted by base metal by weight of about 0.45 to about 0.8 percent Carbon, about 3.5 to about 4.5 percent Boron, about 0.8 to about 1.25 percent Manganese, about 0.6 to about 0.8 percent silicon, about 2.0 to 2.5 percent Nickel, about 4.5 to 6.5 Niobium, and the remainder iron including impurities as trace elements. The hardfacing alloy in undiluted and as-welded condition has a hardness of from about 63 Rc (772 Hv) to 66 Rc (865 Hv). Its hardness, when welded in a single layer on a typical high carbon tool steel joint, reaches about 64 Rc (800 Hv). It is further characterized by high abrasion resistance against silicious rock formations and particles, a low coefficient of friction resulting in excellent metal to metal use or resistance and very significant reduction in induced casing wear, and a boride quadratic crystallographic structure. The hardfacing alloy cracks form in a gradual manner as the weld transforms upon cooling from the liquid state through the plastic state; thus, the cracks are already formed upon solidification, which cracks are in vertical orientation and less subject to traveling in a vertical plane which can induce spalling. It is capable of being welded in single or double layers without any preheat of the wear prone surface and controlled post-welding cooling down conditions. It can be deposited over preexistent weld deposits, such as tungsten carbide deposits and many other previous hardfacing and hardbanding deposits to which it can be welded with the exception of high chrome iron overlays as described in U.S. Pat. No. 5,244,559.

Embodiments of the invention include the hardfacing alloy composition, tool joints, and stabilizers hardbanded with the hardfacing alloy composition. For example, tool joints which connect together drill pipe have an internally threaded box for reception of a threaded pin member, a cylindrical outer surface and a layer of the hardbanding alloy composition welded on the cylindrical outer surface, and on its pin member if desired, which provides tool joint protection from silicious abrasions. Also, stabilizers connected to drill pipe having stabilizer ribs hardbanded with the hardfacing composition which stabilize the drill pipe in the well bore and casing.

Other embodiments of the invention are industrial products having surfaces requiring high abrasion resistance hardfaced with the hardfacing alloy of the invention welded to their wear prone surface, such as abrasion resistance plates and other industrial structures requiring abrasion resistance, as previously set forth.

Advantageously, the hardfacing alloy can be deposited in single and double layers and on top of other preexisting hardfacing alloys with the exception of high chrome iron overlays.

Accordingly, it is an object of the present invention to provide a hardfacing alloy for industrial uses in which the hardfacing alloy is capable of withstanding silicious abrasion, such as having a hardness of from about 63 Rc (772 Hv) to about 66 Rc (865 Hv), as welded and has an optimized balance between abrasive resistance and metal to metal resistance.

It is yet a further object of the present invention to provide such a balanced metal to metal hardfacing alloy which can be utilized to hardband and thereby improve the service life of tool joints connecting drill pipe rotated and moved in casing in earth boring.

A further object of the present invention is to provide a hardfacing alloy which can be utilized to hardband stabilizers which as welded withstands abrasion by silicious formations of the earth and other silicious materials with balanced metal to metal resistance.

A further object of the present invention is to provide other industrial products subject to such abrasion having the hardfacing alloy welded on surfaces subject to such abrasion.

It is a further object of the present invention to provide such a hardfacing alloy for industrial products which have this abrasive resistant alloy welded on their abrasive prone surfaces, which has a low coefficient of friction, excellent abrasion resistance, which in the case of tool joints and stabilizers achieves an optimum balance between the minimizations of induced casing wear in the bore hole, the maximization of tool joint wear resistance, and about 40 percent less casing wear than the hardfacing alloy of U.S. Pat. No. 5,244,559.

Other and further objects, features, and advantages of embodiments of the invention appear throughout.

DESCRIPTION OF PRESENTLY PREFERRED EMBODIMENTS

The hardfacing composition of the present invention comprises by weight from about 0.45 to about 0.8 percent Carbon, about 3.5 to about 4.5 percent Boron, about 0.8 to about 1.25 percent Manganese, about 4.5 to about 6.5 percent Niobium, about 0.6 to about 0.8 silicon, about 2.0 to 2.5 percent Nickel, and the balance iron with impurities as trace elements.

The hardfacing alloy composition of the present invention has an all weld hardness of from about 63 Rc (772 Hv) to 66 Rc (865 Hv), an average hardness single layer on industrial products, such as tool joints and drill stabilizers of about 595 Hv, a quadratic crystallographic boride and eutectic structure, a balance of metal to metal and abrasion resistance, and is capable of being deposited in single and double layers on top of itself or on pre-existent hardband alloys, such as tungsten carbide deposits.

The hardfacing alloy composition is preferably deposited by metal cored tubular wire containing the hardfacing alloy used under gas shielding, such as $CO_2$ especially for tool joints and stabilizers and, if so desired, without gas shielding for hardbanding the surfaces of tool joints and stabilizers, as subsequently described, as well as other industrial applications including earthmoving and dredging equipment and components such as bucket teeth, gravel pump parts, crusher hammers, conveyor chains, gear teeth, and metal to metal sliding parts in the industry.

The chemical analysis of a preferred alloy composition of the invention is set forth in the following table 1.

TABLE 1

| Carbon | 0.7% |
| --- | --- |
| Boron | 4.3% |
| Niobium | 5.0% |
| Nickel | 2.0% |
| Manganese | 1.0% |
| Silicon | 0.65% |

Remainder Iron (including trace elements as contaminants)

The hardfacing alloy set forth in Table 1 as welded to hardband tool joints, stabilizers, or hardfacing surfaces of other industrial products has the properties previously set forth, has a typical hardness as deposited of about 63 Rc (772 Hv) to about 66 Rc (865 Hv), has primary borides characterized by a quadratic structure as welded on a surface which while having cracks functions essentially as crack-free.

The following embodiment of the present invention is a tool joint hardbanded with the essentially crack free hardfacing alloy of the present invention.

Figure 1:
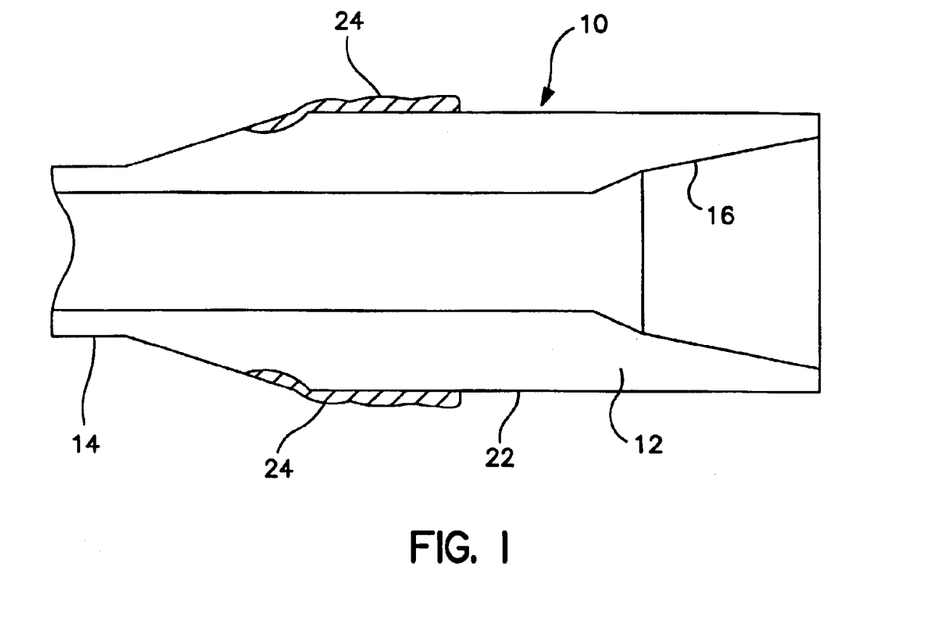
FIG. 1 is a fragmentary longitudinal sectional view of a box of a tool joint with a raised hardband according to the invention.
Figure 2:
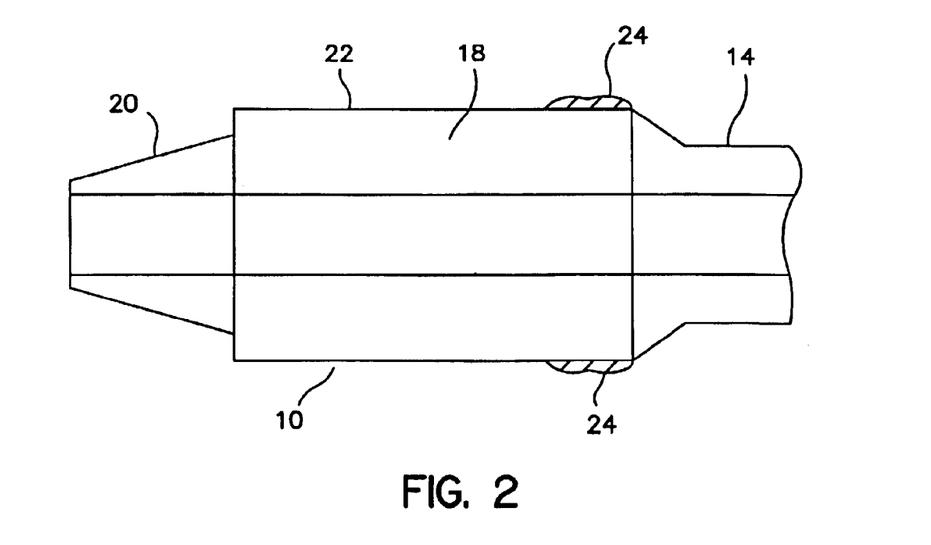
FIG. 2 is a view similar to FIG. 1 illustrating a pin of the tool joint with a raised hardband according to the invention.

Referring now to FIGS. 1 and 2, a tool joint for drill pipe 10 is illustrated which has a box 12 at the end of the drilling pipe 14 which is internally threaded at 16 which threadedly receives a pin 18 having coacting threads 20 to the threads 16 so that the pin 18 can be threaded into box 12. The pin 18 forms the end of a drill pipe, such as 14, so that a string or joints of pipe can be threadedly secured together and disconnected for drilling oil, gas, and other wells.

The box 12 and the pine 18 are enlarged and have a outer cylindrical surfaces 22 having an outer diameter greater than the outer diameter of the drill pipe 14 for deposit of the beads 24 of the hardbanding alloy of the present invention.

Figure 3:
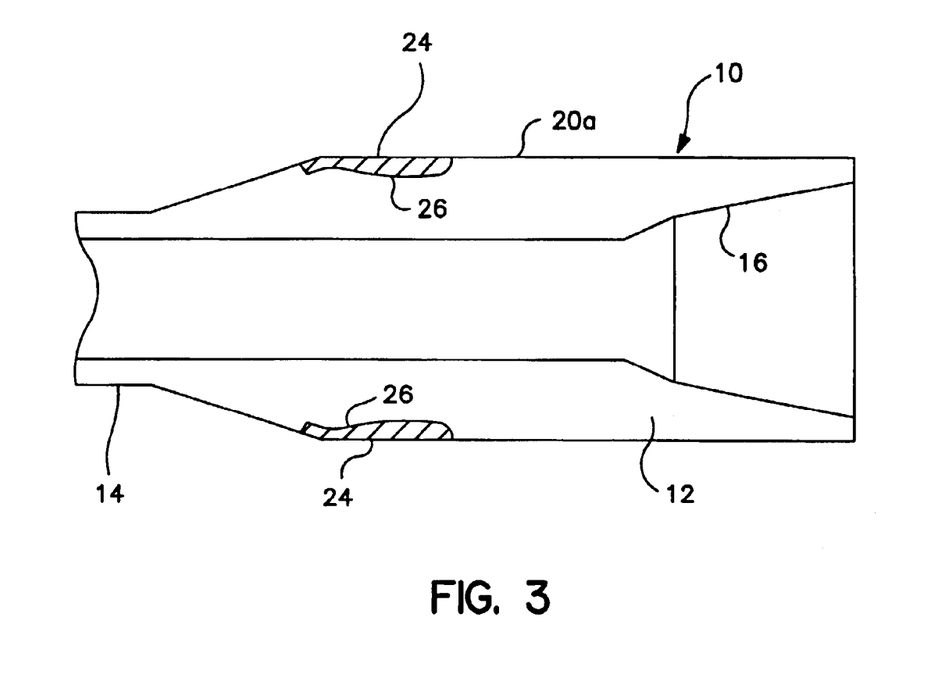
FIG. 3 is a view similar to FIG. 1 illustrating flush hardbanding of a box of the tool joint according to the invention.
Figure 4:
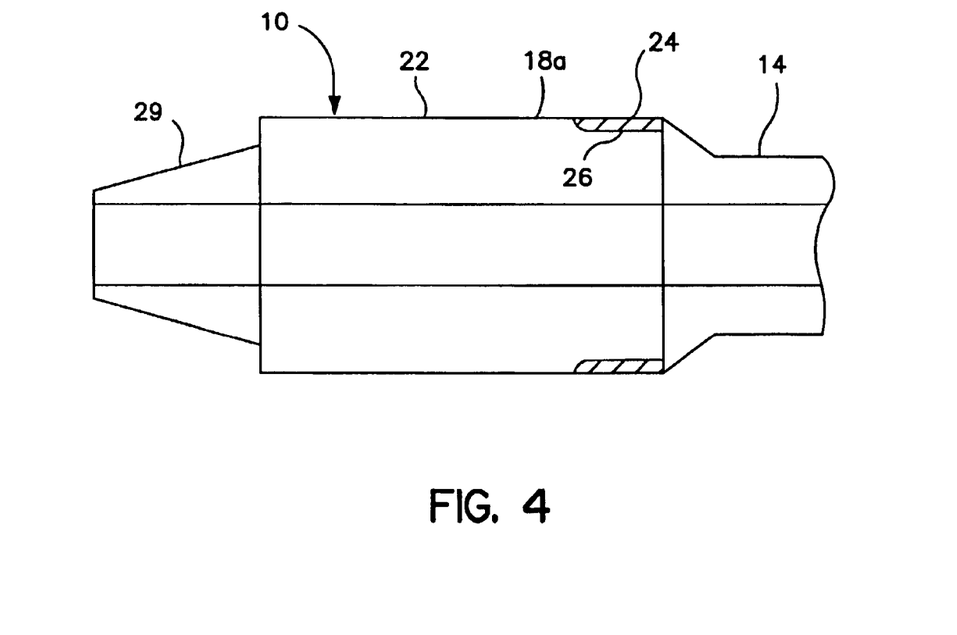
FIG. 4 is a view similar to FIG. 1 illustrating flush hardbanding of a pin of the tool joint according to the invention.

Referring now to FIGS. 3 and 4 where the reference letter "a" has been added to reference numerals corresponding to those in FIGS. 1 and 2, the tool joint 10a of FIGS. 3 and 4 is identical to that of the tool joint 10 of FIGS. 1 and 2 except that it has a reduced cylindrical portion 26 formed by either the removal of a circumferential band of material from the outer cylindrical surfaces 22a of the box 12a and the pine 18a or was originally formed with these reduced diameter sections 22a, and the hardbanding alloy in beads 24a is welded in this space so that the surface of the weld deposited hardfacing is substantially flush with the outer cylindrical surface of the box 12a and the pin 18a.

Figure 5:
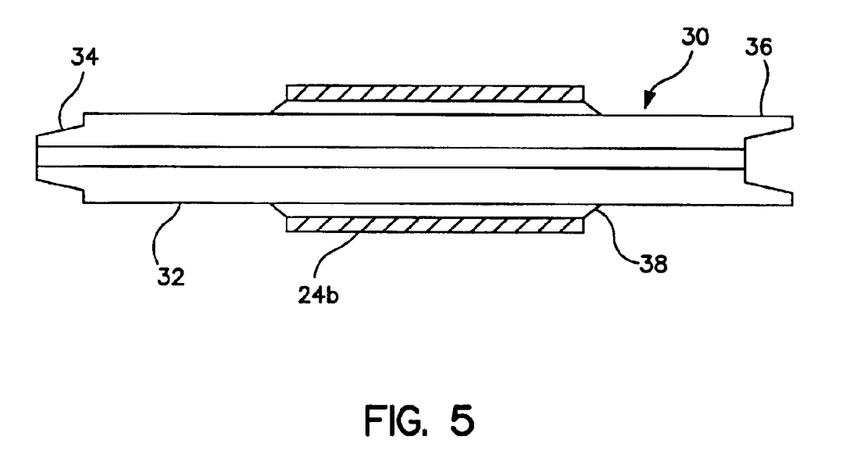
FIG. 5 is a longitudinal view of a stabilizer hardbanded according to the invention.

Referring to FIG. 5, a stabilizer 30 according to the invention is illustrated which has an elongated cylindrical or pipe-like body 32 having the pin 34 and box 36 for connection in a string of drill pipe (not shown), the stabilizer having the stabilizer ribs 38 extending outwardly from the body 32 for stabilizing the drill pipe in a well bore (not shown) to which the stabilizer ribs 38 the hardbanding alloy 24b is welded.

Figure 6:
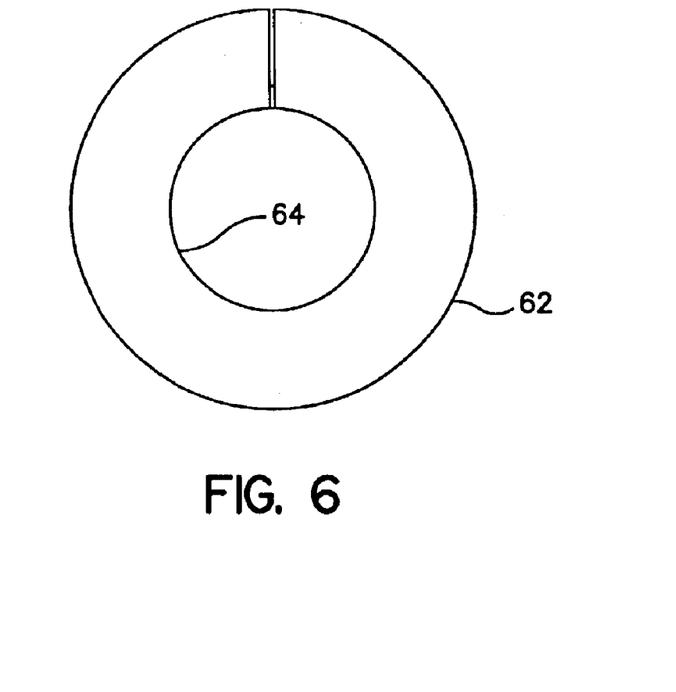
FIG. 6 is a cross-sectional view of a cored wire with a butt seam joint.
Figure 7:
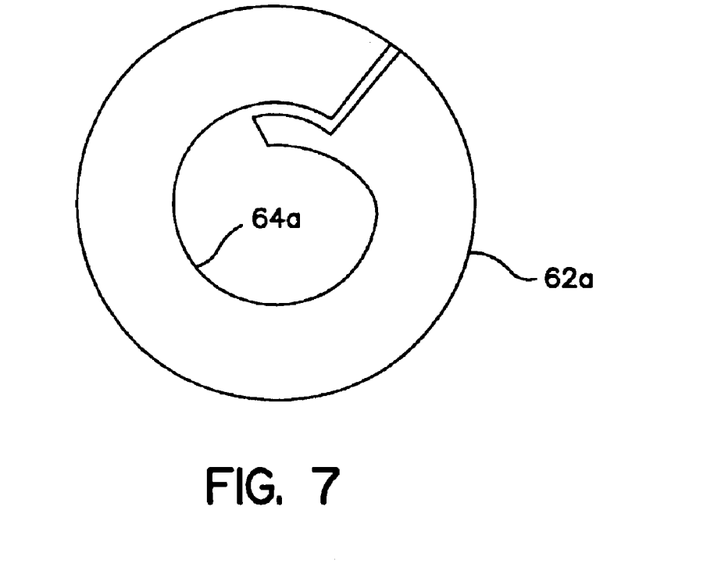
FIG. 7 is a cross-sectional view of a cored wire with an overlap seam joint.

Referring now to FIGS. 6 and 7, tubular butt seam wires 62 and 62a having cores 64 and 64a of the weldable alloy composition are illustrated. In both cored tubular wires 62 and 62a, the cores 64 and 64a can be completely metallic powders, called metal cored, or a mixture of metal and mineral powders, called flux cored. In each case, the cored powders with the iron wire make up the alloy composition of the hardfacing or hardbanding alloy of the present invention. Since cored wires are well known in the art and trade, no further description is given thereof or deemed necessary.

After long periods in service where abrasion by earth materials or silicious or other materials may abrade away an area of the hardfacing, additional hardbanding may be applied as indicated above without essential damage to the box 12 or pin 20 of the tool joint 10 and on the stabilizer ribs 38 of the stabilizer 30.

Figure 8:
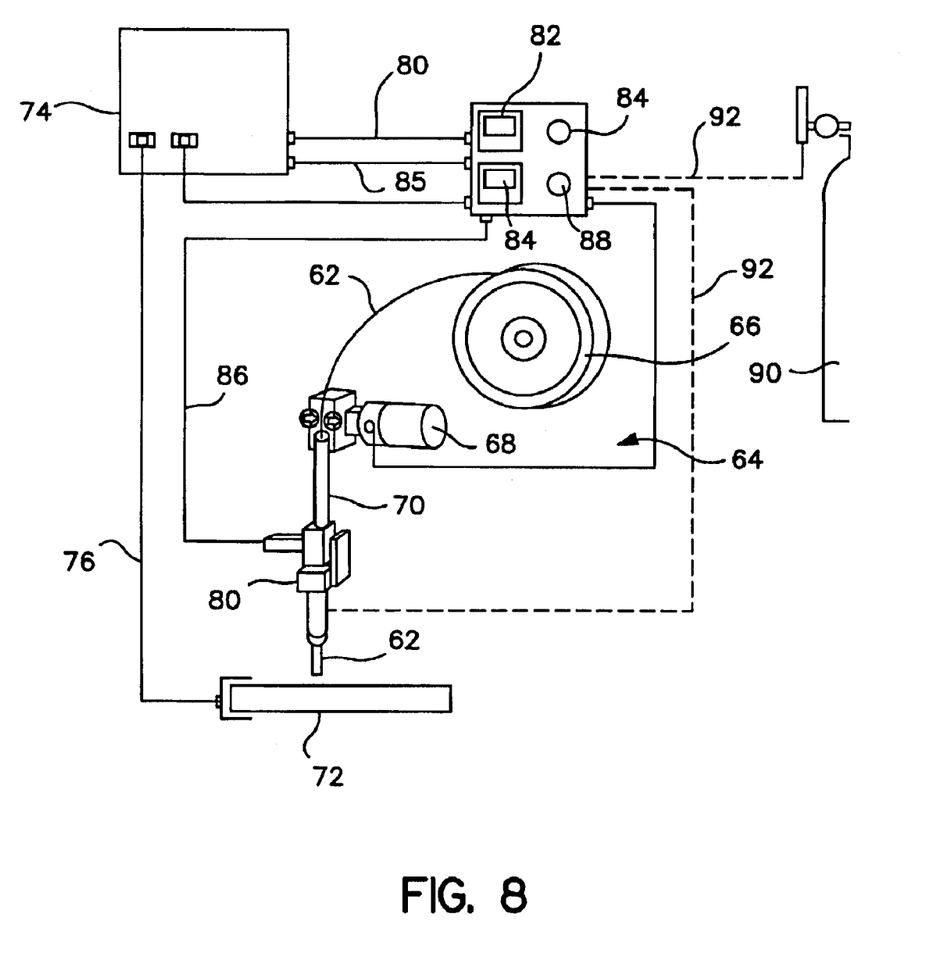
FIG. 8 is a diagrammatic view of apparatus suitable for welding a cored wire of the hardfacing alloy in open, gas shielded or submerged arc.

Referring now to FIG. 8 schematically illustrating apparatus useful in the method of the invention, the apparatus 64 includes a reel 66, a cored wire 62 (or 62a) wound around it, driven by the wire drive motor 68 through the guide tube 70 to the industrial product 72 to be hardfaced or hardbanded. A direct current, constant voltage power source 74 provides electrical energy through the electrical power cable 76 to the industrial product 72, and by the electric power cable 80 to the volt meter 82 and the voltage control 84. The electric cable 85 provides a voltage supply to the voltmeter and then through the electrode power cable 86 to the guide tube 70 and to the cored wire 62 or 62a.

When desired to be used, gas shielding is illustrated diagrammatically by the gas shielding source 90 through the gas tube 92 to the control switch 98 and to the guide tube 99 to provide shielding for electrodes requiring it.

The method of the invention for prolonging the surface life of tool joints, stabilizers, and other industrial products comprises hardfacing or hardbanding by tubular wire, in open arc, gas shielded or submerged arc, a layer of the hardbanding alloy of the present invention 24, 24a, or 24b to the outer cylindrical surface 22 or 22a of the box 12 or 12a of the tool joints 10 and 10a (FIGS. 1, 2), the outer cylindrical surface 22 of the pin 18 (FIGS. 3 and 4) and the stabilizer ribs 38 (FIG. 5). Normally, the weld beads 24 of the hardbanding alloy are about 3/32 to 1/4 inch thick without detriment to the alloy properties and can be deposited in single or double layers. If desired, the surfaces 22a of the weld beads 24 can be substantially flush with the surface of the box 12a, and about 3/32 inch of material is removed.

No more description is given or deemed necessary of apparatus for welding the alloy compositions of the tubular wire 52 or to such other apparatus and means to a surface to be hardfaced or hardbanded, as they are well known to those skilled in the art.

While the present invention is particularly suited for hardbanding tool joints and stabilizers, it may be applied to any surface requiring hardbanding or facing, such as structural members, process components, abrasion resistant plates, and the like.

The present invention, therefore, is well suited and adapted to attain the objects and ends and has the advantages and features mentioned as well as others inherent therein.

While presently preferred embodiments of the invention have been given for the purposes of disclosure, changes may be made within the spirit of the invention as defined by the scope of the appended claims.

What is claimed is:

1. A hardfacing alloy for welding to a surface to be abrasion resistant comprising by weight, about 0.45 to about 0.8 percent Carbon, about 3.5 to about 4.5 percent Boron, about 4.5 to about 6.5 percent Niobium, about 2.0 to 2.5 percent Nickel, about 0.8 to about 1.25 Manganese, about 0.6 to about 0.8 percent silicon, and the balance iron, including impurities as trace elements, the alloy having a quadratic crystallographic boride and eutectic structure and a hardness of from about 63 Rc (772 Hv) to about 66 Rc (865 Hv).

2. An industrial product having a surface subject to abrasion comprising, a layer of the hardbanding alloy of claim 1 welded to the surface of the industrial product subject to such abrasion.

3. The industrial product of claim 2 comprising, a stabilizer having a cylindrical body and an internally threaded box and an externally threaded pin for connection in a string of drill pipe, stabilizer ribs having outer surfaces subject to the abrasion extending from an outer surface of the cylindrical body effective to stabilize the string of drill pipe in a well bore, and a layer of the hardfacing alloy of claim 1 welded to the outer surfaces of the stabilizer ribs subject to the abrasion.

4. A tool joint for connecting together drill pipe, the tool joint having a cylindrical body, an internally threaded box which has an outer cylindrical surface of a diameter greater than the drill pipe, and an externally threaded pin including, at least one layer of the hardfacing alloy of claim 1 welded to the outer cylindrical surface of one or both of the box or pin, thereby providing surface resistance to abrasion by silicious materials.

5. The tool joint of claim 4 where, the outer cylindrical surface of one or both the box or pin has a reduced diameter portion extending along a substantial portion of its length, and the layer of hardfacing alloy is welded to the reduced diameter portion of one or both of the box and the pin.

6. A method of prolonging the life of an industrial product subject to abrasion of the order of silicious materials comprising, welding a layer of the hardfacing alloy of claim 1 to one or more surfaces of the industrial product subject to the abrasion.

7. The method of claim 6 where, the welding of the layer of the hardfacing alloy is contained in a metal core tubular wire with or without a gas shield.

* * * * *